United States Patent
Hasegawa et al.

(10) Patent No.: US 9,140,938 B2
(45) Date of Patent: Sep. 22, 2015

(54) LIQUID CRYSTAL DISPLAY DEVICE

(71) Applicants: Hitomi Hasegawa, Saitama-ken (JP); Hirokazu Morimoto, Saitama-ken (JP)

(72) Inventors: Hitomi Hasegawa, Saitama-ken (JP); Hirokazu Morimoto, Saitama-ken (JP)

(73) Assignee: Japan Display Inc., Tokyo (JP)

( * ) Notice: Subject to any disclaimer, the term of this patent is extended or adjusted under 35 U.S.C. 154(b) by 129 days.

(21) Appl. No.: 13/750,198

(22) Filed: Jan. 25, 2013

(65) Prior Publication Data

US 2013/0265515 A1    Oct. 10, 2013

(30) Foreign Application Priority Data

Apr. 6, 2012    (JP) .................................. 2012-087879

(51) Int. Cl.
 *G02F 1/1343*    (2006.01)
 *G02F 1/1337*    (2006.01)

(52) U.S. Cl.
 CPC .... *G02F 1/134336* (2013.01); *G02F 1/133707* (2013.01); *G02F 1/133753* (2013.01); *G02F 2001/133757* (2013.01); *G02F 2001/134318* (2013.01); *G02F 2202/00* (2013.01)

(58) Field of Classification Search
 CPC . G02F 1/1333; G02F 1/136; G02F 1/136286; G02F 1/133512; G02F 1/133514; G02F 1/1337; G02F 1/133723; G02F 1/133784; G02F 1/133788; G02F 1/1362; G02F 1/136213; G02F 1/134336; G02F 1/134363; G02F 2202/28; G02F 2001/134318
 USPC ............ 349/123, 106, 43, 110, 42, 141, 143, 349/122, 139, 96, 38; 428/1.2; 156/272.2, 156/275.5, 307.3
 See application file for complete search history.

(56) References Cited

U.S. PATENT DOCUMENTS

| | | | |
|---|---|---|---|
| 6,266,116 | B1 | 7/2001 | Ohta et al. |
| 7,755,380 | B2 * | 7/2010 | Park et al. ................. 324/760.01 |
| 8,493,301 | B2 * | 7/2013 | Sekine et al. ................... 345/87 |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

U.S. Appl. No. 13/785,295, filed Mar. 5, 2013, Hasegawa, et al.

(Continued)

*Primary Examiner* — Thoi Duong
(74) *Attorney, Agent, or Firm* — Oblon, McClelland, Maier & Neustadt, L.L.P.

(57) ABSTRACT

In one embodiment, a first substrate includes a gate line, a source line, a switching element electrically connected with the gate line and the source line, and a pixel electrode including a sub-pixel electrode electrically connected with the switching element in the shape of a belt, and a main pixel electrode electrically connected with the sub-pixel electrode. A first alignment film covers the pixel electrode. A second substrate includes a common electrode having a pair of main common electrodes arranged on both sides sandwiching the main pixel electrode. A second alignment film covers the common electrode. A liquid crystal layer including liquid crystal molecules is held between the first substrate and the second substrate. Volume resistivity values of the first and second alignment films are lower than that of the liquid crystal layer.

4 Claims, 5 Drawing Sheets

(56) References Cited

U.S. PATENT DOCUMENTS

| | | | |
|---|---|---|---|
| 8,512,819 B2* | 8/2013 | Matsumori et al. | 428/1.1 |
| 8,797,482 B2* | 8/2014 | Tago et al. | 349/103 |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2009/0207363 A1* | 8/2009 | Hirosawa | 349/139 |
| 2010/0294650 A1* | 11/2010 | Takahashi et al. | 204/192.17 |
| 2012/0086892 A1* | 4/2012 | Kim et al. | 349/96 |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |

OTHER PUBLICATIONS

U.S. Appl. No. 13/749,950, filed Jan. 25, 2013, Morita, et al.

U.S. Appl. No. 13/763,888, filed Feb. 11, 2013, Hasegawa, et al.

* cited by examiner

LIQUID CRYSTAL DISPLAY DEVICE

CROSS-REFERENCE TO RELATED APPLICATION

This application is based upon and claims the benefit of priority from prior Japanese Patent Application No. 2012-087879 filed Apr. 6, 2012, the entire contents of which are incorporated herein by reference.

FIELD

Embodiments described herein relate generally to a liquid crystal display device.

BACKGROUND

In recent years, a flat panel display device is developed briskly. Especially, the liquid crystal display device gets a lot of attention from advantages, such as light weight, thin shape, and low power consumption. In an active matrix type liquid crystal display device equipped with a switching element in each pixel, structures using lateral electric field, such as IPS (In-Plane Switching) mode and FFS (Fringe Field Switching) mode, attract attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate. Furthermore, review for optimizing volume resistivity of the liquid crystal layer and the alignment film have been made in order to prevent from generating of display defect resulted from a burn-in phenomenon.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a gate line and an auxiliary capacitance line respectively extending in a first direction, a source line extending in a second direction orthogonally crossing the first direction, a switching element electrically connected with the gate line and the source line, a pixel electrode including a sub-pixel electrode electrically connected with the switching element and extending in the first direction in the shape of a belt, and a main pixel electrode electrically connected with the sub-pixel electrode and extending in the second direction, a first alignment film covering the pixel electrode, and a second substrate including; a common electrode having a pair of main common electrodes arranged on both sides sandwiching the main pixel electrode and extending in the second direction, a second alignment film covering the common electrode, and a liquid crystal layer held between the first substrate and the second substrate and including liquid crystal molecules; wherein a volume resistivity value of the first and second alignment films is lower than that of the liquid crystal layer.

According to other embodiment, a liquid crystal display device includes: comprising: a first substrate including; a gate line and an auxiliary capacitance line respectively extending in a first direction, a source line extending in a second direction orthogonally crossing the first direction, a switching element electrically connected with the gate line and the source line, a pixel electrode including a sub-pixel electrode electrically connected with the switching element and extending in the first direction in the shape of a belt, and a main pixel electrode electrically connected with the sub-pixel electrode and extending in the second direction, a first alignment film covering the pixel electrode, and a second substrate including; a common electrode having a pair of main common electrodes arranged on both sides sandwiching the main pixel electrode and extending in the second direction, a second alignment film covering the common electrode, and a liquid crystal layer held between the first substrate and the second substrate and including liquid crystal molecules; a first optical element including a first polarization plate attached to an outer surface of the first substrate by a first adhesives; and a second optical element including a second polarization plate attached to an outer surface of the second substrate by a second adhesives; wherein a volume resistivity value of the second alignment film is lower than that of the liquid crystal layer, and a volume resistivity of the second adhesives is equal to or less than that of the second alignment film.

Figure 1:
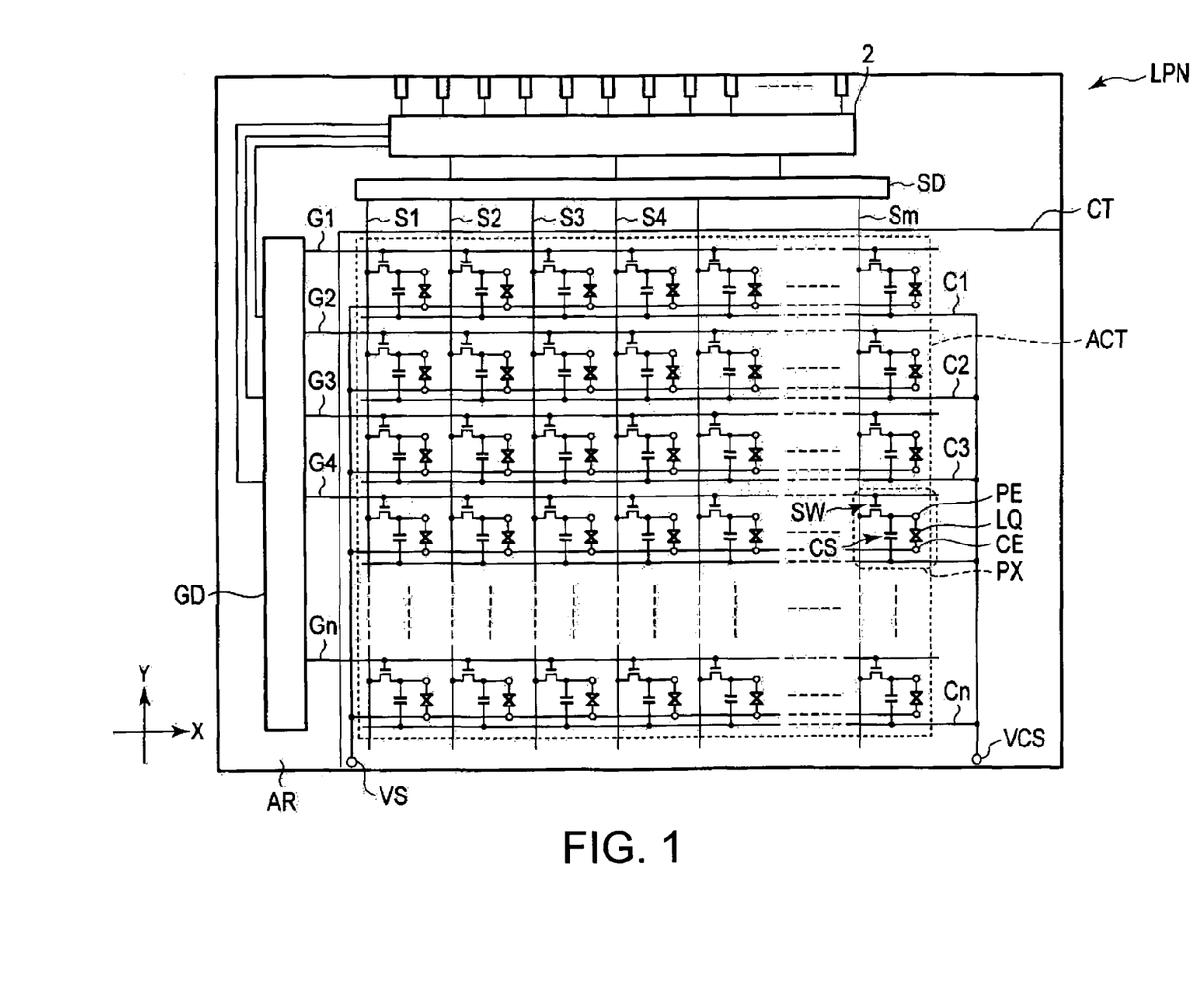
FIG. 1 is a figure schematically showing a structure and the equivalent circuit of a liquid crystal display device according to one embodiment.

FIG. 1 is a figure schematically showing a structure and the equivalent circuit of the liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. The active area ACT is constituted by a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the active area ACT.

The gate line G and the auxiliary capacitance line C linearly extend in a first direction X, respectively. The gate line G and the auxiliary capacitance line C are arranged in turns along a second direction Y that orthogonally intersects the first direction X apart from each other. The source lines S cross the gate line G and the capacitance line C. The source lines S extend linearly in the second direction Y, respectively. The gate line G, the auxiliary capacitance line C and the source lines S do not necessarily extend linearly, and a portion thereof may be crooked partially.

Each gate line G is pulled out to outside of the active area ACT and connected to a gate driver GD. Each source line S is pulled out to the outside of the active area ACT and connected to a source driver SD. At least a portion of the gate driver GD and the source driver SD is formed in the array substrate AR, for example, and connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which an auxiliary capacitance voltage is impressed.

In addition, in the liquid crystal display panel LPN according to this embodiment, while the pixel electrode PE is formed in the array substrate AR, at least a portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is lateral electric field substantially in parallel with the principal surface of the array substrate AR or the counter substrate CT, or an oblique electric field slightly oblique with respect to the principle surfaces of the substrates.

The switching element SW is constituted by an n channel type thin film transistor (TFT), for example. The switching element SW is electrically connected with the gate line G and the source line S. The switching element SW may be either a top-gate type or a bottom-gate type. Though the semiconductor layer is formed of poly-silicon, the semiconductor layer may be formed of amorphous silicon.

The pixel electrode PE is arranged in each pixel and electrically connected with the switching element SW. The common electrode CE is arranged in common to the plurality of pixel electrodes PE through the liquid crystal layer LQ. Though the pixel electrode PE and the common electrode CE are formed by light transmissive conductive materials such as Indium Tin Oxide (ITO), Indium Zinc Oxide (IZO), etc., other metals such as aluminum may be used.

The array substrate AR includes an electric power supply portion VS formed outside of the active area ACT for impressing a voltage to the common electrode CE. Furthermore, the common electrode CE is drawn to outside of the active area ACT and electrically connected with an electric power supply portion VS formed in the array substrate AR through an electric conductive component which is not illustrated.

Figures 2A, 2B, 2D:
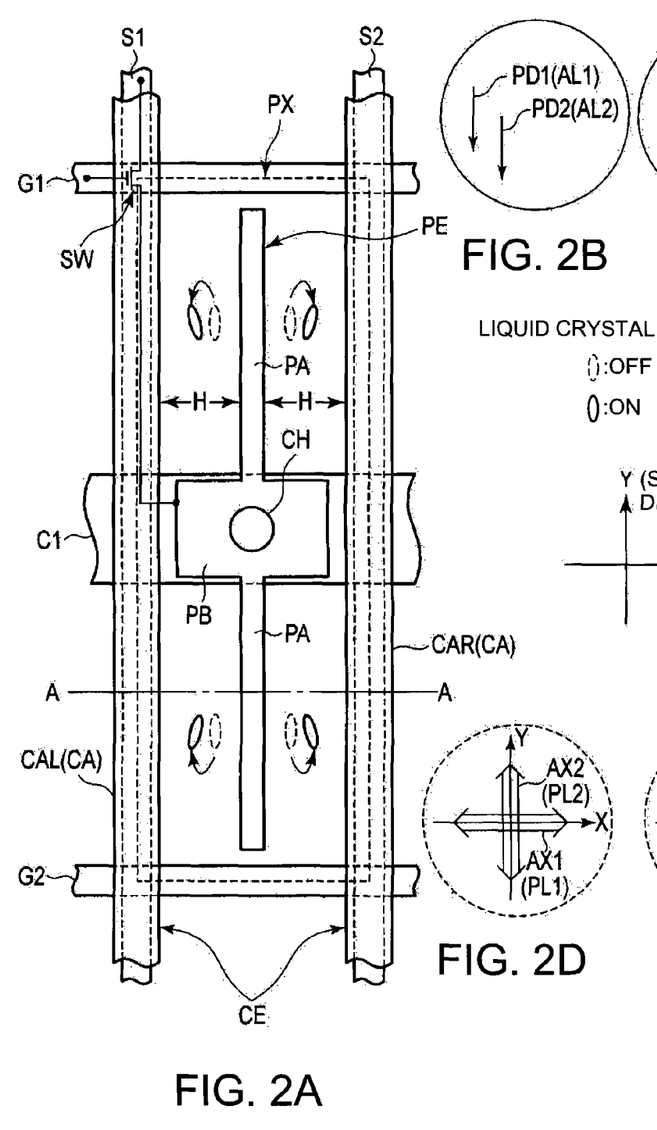
FIG. 2A is a plan view schematically showing a structure of one pixel when a display panel shown in FIG. 1 is seen from a counter substrate side according to a first embodiment.
FIGS. 2B and 2C are views showing alignment treatment directions.
FIGS. 2D and 2E are views showing polarizing axis directions of polarization plates.

FIG. 2A is a plan view schematically showing the structure of one pixel when the liquid crystal display panel according to a first embodiment is seen from the counter substrate side. Herein, a plan view in a X-Y plane specified in the first direction X and the second direction Y is shown.

The gate line G1, the gate line G2, and the auxiliary capacitance line C1 extend along the first direction X, respectively. The source line S1 and source line S2 extend along the second direction Y, respectively. The auxiliary capacitance line C1 is located substantially in the middle between the gate line G1 and the gate line G2. That is, the distance between the gate line G1 and the auxiliary capacitance line C1 in the second direction Y is substantially the same as that between the gate line G2 and the auxiliary capacitance line C1 in the second direction Y.

In this embodiment, the pixel PX corresponds to a square formed of the gate line G1, the gate line G2, the source line S1, and the source line S2 and has a shape of a rectangle whose length in the second direction Y is longer than that in the first direction X, as shown by a dashed line in the figure. The length of the pixel PX in the first direction X corresponds to a pitch in the first direction X between the source line S1 and the source line S2, and the length in the second direction Y of the pixel PX corresponds to the pitch in the second direction Y between the gate line G1 and the gate line G2. The pixel electrode PE is arranged between adjoining source line S1 and source line S2. Moreover, the pixel electrode PE is located between the gate line G1 and the gate line G2.

In this embodiment, the source line S1 is arranged at the left-hand side end in the pixel PX. Precisely, the source line S1 is arranged striding over a boundary between the illustrated pixel and a pixel PX adjoining the illustrated pixel PX on the left-hand side. The source line S2 is arranged at the right-hand side end. Precisely, the source line S2 is arranged striding over a boundary between the illustrated pixel and a pixel PX adjoining the illustrated pixel PX on the right-hand side. Moreover, in the pixel PX, the gate line G1 is arranged at an upper end portion. Precisely, the gate line G1 is arranged striding over a boundary between the illustrated pixel and a pixel which adjoins the illustrated pixel PX on its upper end side. The gate line G2 is arranged at a lower end portion. Precisely, the gate line G2 is arranged striding over a boundary between the illustrated pixel and a pixel which adjoins the illustrated pixel PX on its lower end side. The auxiliary capacitance line C1 is arranged approximately in a central portion of the pixel PX.

The switching element SW is electrically connected with the gate line G1 and the source line S1 in the illustrated example. Namely, the switching element SW is formed in an intersection of the gate line G1 with the source line S1. A drain line extends along the source line S1 and the auxiliary capacitance line C1, and is electrically connected with the pixel electrode PE through a contact hole CH formed in a region which overlaps with the auxiliary capacitance line C1. The switching element SW hardly runs off the overlapped region with the source line S1 and the auxiliary capacitance line C1. Thereby, reduction of the area of an aperture which contributes to a display is suppressed when the switching element SW is formed in the pixel PX.

The pixel electrode PE is equipped with a main pixel electrode PA and a sub-pixel electrodes PB. The main pixel electrodes PA and the sub-pixel electrode PB are formed integrally or continuously, and electrically connected mutually. In addition, although only the pixel electrode PE arranged in one PX is illustrated in the figure, the pixel electrode of the same form is arranged about other pixels which are not illustrated.

The main pixel electrode PA extends along the second direction Y, and is formed in the shape of a belt having a predetermined width along the first direction X. The main pixel electrode PA is located approximately in the center between the source line S1 and the source line S2. That is, the distance between the source line S1 and the main pixel electrode PA in the first direction X is substantially the same as that between the source line S2 and the main pixel electrode PA in the first direction X.

Moreover, in this embodiment, the sub-pixel electrode PB is formed in the shape of a belt extending the first direction X. The sub-pixel electrode PB crosses the main pixel electrode PA in an intermediate portion thereof in the second direction Y. That is, the pixel electrode PE is formed in a cross shape. Further, the sub-pixel electrode PB is located on the auxiliary capacitance line C1. The whole sub-pixel electrode PB is located in a region which overlaps with the auxiliary capacitance line C1. The sub-pixel electrode PB is electrically connected with the switching element SW through a contact hole CH.

The common electrode CE is equipped with a main common electrode CA. The main common electrodes CA linearly extend along the second direction Y in parallel to the main pixel electrode PA on both sides which sandwich the main pixel electrode PA in the X-Y plane. The main common electrode CA is formed in the shape of a belt having the same width in the first direction X.

In the illustrated example, the main common electrode CA is arranged in two lines along the first direction X. Hereinafter, in order to distinguish the two lines, the main common electrode CA on the left-hand side in the figure is called CAL, and the main common electrode on the right-hand side in the figure is called CAR. Precisely, the main common electrode CAL is arranged striding over a boundary between the illustrated pixel and a pixel which adjoins the illustrated pixel PX on the left-hand side. The main common electrode CAR is arranged at the right-hand side end. Precisely, the main common electrode CAR is arranged striding over a boundary between the illustrated pixel and a pixel which adjoins the illustrated pixel PX on the right-hand side. The main common electrode CAL counters with the source line S1, and the main common electrode CAR counters with the source line S2. The main common electrode CAL and the main common electrode CAR are electrically connected in the active area or outside of the active area.

If its attention is paid to the positional relationship between the pixel electrode PE and the common electrode CE in the X-Y plane, the main pixel electrode PA and the main common electrode CA are arranged by turns along the first direction X. That is, one main pixel electrode PA is arranged between the adjoining main common electrode CAL and main common electrode CAR. The main pixel electrode PA is located substantially in the center between main common electrode CAL and main common electrode CAR. Namely, the distances between the main common electrode CAL and the main pixel electrode PA, and between the main common electrode CAR and the main pixel electrode PA are substantially the same in the first direction X.

Figure 3:
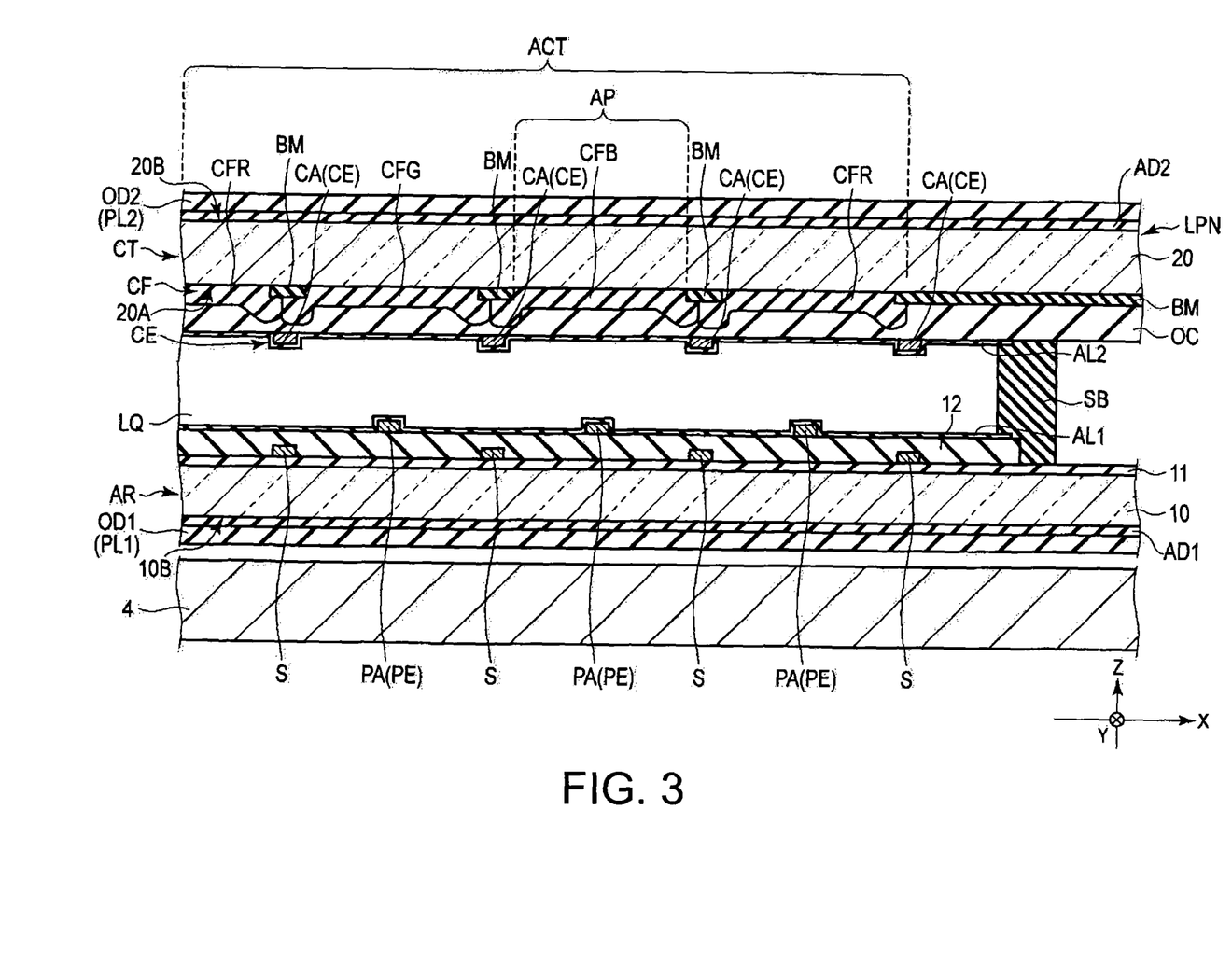
FIG. 3 is a cross-sectional view schematically showing the structure of the liquid crystal display panel taken along line A-A shown in FIG. 2A.

FIG. 3 is a cross-sectional view schematically showing the structure of the liquid crystal display panel taken along line A-A shown in FIG. 2A. In addition, only the portion required for explanation is illustrated here.

A backlight 4 is arranged on the back side of the array substrate AR in the illustrated example. Various types of backlights can be used. For example, a light emitting diode (LED) and a cold cathode fluorescent lamp (CCFL), etc., can be applied as a light source of the backlight 4, and the explanation about its detailed structure is omitted.

The array substrate AR is formed using a first insulating substrate 10 which has a transmissive characteristics. The source line S is formed on a first interlayer insulating film 11 and covered with a second interlayer insulating film 12. In addition, the gate line and the auxiliary capacitance line which are not illustrated are arranged between the first insulating substrate 10 and the first interlayer insulating film 11, for example. The pixel electrode PE is formed on the second interlayer insulating film 12. The pixel electrode PE is located inside of the pixel rather than the positions on the respective adjoining source lines S.

A first alignment film AL1 is arranged on the array substrate AR facing the counter substrate CT, and extends to whole active area ACT. The first alignment film AL1 covers the pixel electrode PE, etc., and is also arranged on the second interlayer insulating film 12. The first alignment film AL1 is formed of the material which shows a horizontal alignment characteristics.

The counter substrate CT is formed using a second insulating substrate 20 which has a transmissive characteristics. The counter substrate CT includes a black matrix BM, a color filter CF, an overcoat layer OC, the common electrode CE, and a second alignment film AL2, etc.

The black matrix BM is formed on the second insulating substrate 20 defining each pixel PX, and forms an aperture portion AP facing the pixel electrode PE. That is, the black matrix BM is arranged so that line portions, such as the source line S, the gate line G, the auxiliary capacitance line C1, and the switching element SW, may counter the black matrix BM. Herein, though only a portion of the black matrix BM extending along the second direction Y is shown, the black matrix BM may include a portion extending along the first direction X. The black matrix BM is formed on an internal surface 20A of the second insulating substrate 20 facing the array substrate AR.

The color filter CF is arranged corresponding to each pixel PX. That is, while the color filter CF is arranged in the aperture portion AP in the internal surface 20A of the second insulating substrate 20, a portion thereof runs on the black matrix BM. The colors of the color filters CF arranged in the adjoining pixels PX in the first direction X differ mutually. For example, the color filters CF are formed of resin materials colored by three primary colors of red, blue, and green, respectively. The red color filter CFR formed of resin material colored in red is arranged corresponding to the red pixel. The blue color filter CFB formed of resin material colored in blue is arranged corresponding to the blue pixel. The green color filter CFG formed of resin material colored in green is arranged corresponding to the green pixel. The boundary between the adjoining color filters CF is located in a position which overlaps with the black matrix BM. The overcoat layer OC covers the color filter CF. The overcoat layer OC eases influence of concave-convex of the surface of the color filter CF. The overcoat layer OC is formed of transparent material.

The common electrode CE is formed on the overcoat layer OC facing the array substrate AR. The main common electrode CA is located above the source line S. The second alignment film AL2 is arranged on the counter substrate CT facing the array substrate AR, and extends to whole active area ACT. The second alignment film AL2 covers the common electrode CE, the overcoat layer OC, etc. That is, the second alignment film AL2 contacts the common electrode CE. The second alignment film AL2 is formed of materials which show horizontal alignment characteristics.

Figure 2C:
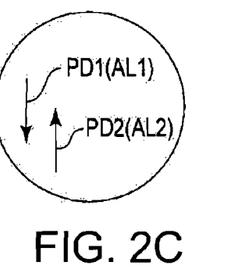

An alignment treatment (for example, rubbing processing or light alignment processing) is performed to the first alignment film AL1 and the second alignment film AL2 to initially align the molecules of the liquid crystal layer LQ. A first alignment treatment direction PD1 in which the first alignment film AL1 initially aligns the molecules is in parallel with a second alignment treatment direction PD2 in which the second alignment film AL2 initially aligns the molecules. For example, in FIG. 2B, the first alignment treatment direction PD1 and the second alignment treatment direction PD2 are in parallel with the second direction Y and are the same directions each other. In FIG. 2C, the first alignment treatment direction PD1 and the second alignment treatment direction PD2 are in parallel with the second direction Y and are opposite directions each other.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap is formed. The array substrate AR and the counter substrate CT are pasted together by seal material SB arranged outside the active area ACT while the predetermined cell gap is formed.

The liquid crystal layer LQ is held at the cell gap formed between the array substrate AR and the counter substrate CT and arranged between the first alignment film AL1 and the second alignment film AL2. The liquid crystal layer LQ contains the liquid crystal molecule which is not illustrated. The liquid crystal layer LQ is constituted by liquid crystal material having positive dielectric anisotropy (positive type).

A first optical element OD1 is attached on an external surface 10B of the array substrate AR, i.e., the external surface 10B of the first insulating substrate 10 which constitutes the array substrate AR, by adhesives, etc. The first optical element OD1 is located on a side which counters with the backlight 4 of the liquid crystal display panel LPN, and controls the polarization state of the incident light which enters into the liquid crystal display panel LPN from the backlight 4. The first optical element OD1 includes a first polarization plate PL1 having a first polarizing axis (or first absorption axis) AX1. In addition, other optical elements such as a retardation film may be arranged between the first polarization plate PL1 and the first insulating substrate 10.

A second optical element OD2 is attached on an external surface 20B of the counter substrate CT, i.e., the external surface 20B of the second insulating substrate 20 which constitutes the counter substrate CT, by adhesives, etc. The second optical element OD2 is located in a display surface side of the liquid crystal display panel LPN, and controls the polarization state of emitted light from the liquid crystal display panel LPN. The second optical element OD2 includes a second polarization plate PL2 having a second polarizing axis (or second absorption axis) AX2. In addition, other optical elements such as a retardation film may be arranged between the second polarization plate PL2 and the second insulating substrate 20.

Figure 2E:
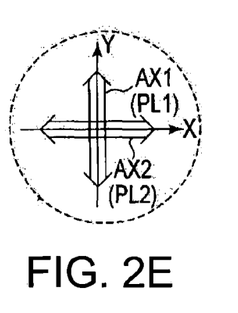

The first polarizing axis AX1 of the first polarization plate PL1 and the second polarizing axis AX2 of the second polarization plate PL2 are arranged in the positional relationship of Cross Nicol. In this state, one polarization plate is arranged so that the polarizing axis becomes in parallel with or orthogonally crosses the initial alignment direction of the liquid crystal molecules. In FIG. 2D, the first polarization plate PL1 is arranged so that the first polarizing axis AX1 crosses the second direction Y i.e., the initial alignment direction of the liquid crystal molecules LM, and the second polarization plate PL2 is arranged so that the second polarizing axis AX2 becomes in parallel with the second direction Y. In FIG. 2E, the second polarization plate PL2 is arranged so that the second polarizing axis AX2 orthogonally crosses the second direction Y, and the first polarization plate PL1 is arranged so that the first polarizing axis AX1 becomes in parallel with the second direction Y.

In this embodiment, the volume resistivity values of the first alignment film AL1 and the second alignment film AL2 are lower than that of the liquid crystal layer LQ. As an example, the volume resistivity values of the first alignment film AL1 and the second alignment film AL2 are an order of $1.0 \times 10^{11}$ Ω·cm or less than that while the volume resistivity value of the liquid crystal layer LQ is an order of $1.0 \times 10^{13}$ Ω·cm or more than that. It is desirable that the volume resistivity values of the first alignment film AL1 and the second alignment film AL2 are set to be less than 1/10 of that of the liquid crystal layer LQ, i.e., approximately 1/100 of that of the liquid crystal layer LQ.

The pixel electrode PE with which the first alignment film AL1 contact and the common electrode CE with which the second alignment film AL2 contacts are respectively formed of materials having further lower volume resistivity value than those of the first alignment film AL1 and the second alignment film AL2.

Moreover, the volume resistivity values of the first adhesive AD1 with which the first optical element OD1 is attached to the external surface of the array substrate AR and the second adhesive AD2 with which the second optical element OD2 is attached to the external surface of the counter substrate CT are equal to or less than those of the first alignment film AL1 and the second alignment film AL2. As an example, the volume resistivity values of the first adhesives AD1 and the second adhesives AD2 are approximately $0.2 \times 10^{11}$ Ω·cm to $0.7 \times 10^{11}$ Ω·cm.

The operation of the liquid crystal display panel LPN of the above-mentioned structure is explained referring to FIGS. 2A, 2B, 2C, 2D, 2E and 3.

At the time of non-electric field state, i.e., when a potential difference (i.e., electric field) is not formed between the pixel electrode PE and the common electrode CE, the liquid crystal molecules LM of the liquid crystal layer LQ are aligned so that their long axis are aligned in a parallel direction with the first alignment direction PD1 of the first alignment film AL1 and the second alignment direction PD2 of the second alignment film AL2 as shown with a dashed line in the figure. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with the X-Y plane, but are pre-tilted in many cases. For this reason, the precise direction of the initial alignment is a direction in which an orthogonal projection of the alignment direction of the liquid crystal molecule LM at the time of OFF is carried out to the X-Y plane. However, in order to explain simply hereinafter, the liquid crystal molecule LM is assumed that the liquid crystal molecule LM is aligned in parallel with the X-Y plane, and is explained as what rotates in a field in parallel with the X-Y plane.

Here, both of the first alignment treatment direction PD1 of the first alignment film AL1 and the second alignment treatment direction PD2 of the second alignment film AL2 are directions in parallel to the second direction Y. At the time of OFF, the long axis of the liquid crystal molecule LM is aligned substantially in parallel to the second direction Y as shown with the dashed line in FIG. 2A. That is, the direction of the initial alignment of the liquid crystal molecule LM is in parallel to the second direction Y, or makes an angle of 0° with respect to the second direction Y.

When the respective first alignment treatment direction PD1 and second alignment treatment direction PD2 are in parallel and the same directions each other, the liquid crystal molecule LM is aligned with approximately horizontal direction (i.e., the pre tilt angle is approximately zero) in a cross-section of the liquid crystal layer LQ in the intermediate portion of the liquid crystal layer LQ. The liquid crystal molecule LM is aligned with the pre-tilt angle so that the alignment of the liquid crystal molecule LM near the first alignment film AL1 and the second alignment film AL2 becomes symmetrical with respect to the intermediate portion of the liquid crystal layer LQ (splay alignment). Thus, in the splay alignment state, the display is optically compensated even in an inclining direction from the normal line of the substrate by the liquid crystal molecules LM near the first alignment film AL1 and the second alignment film AL2. Therefore, when the respective first alignment treatment direction PD1 and second alignment treatment direction PD2 are in parallel and the same directions each other, there are few optical leaks in a black display. Accordingly, a high contrast ratio can be realized, and it becomes possible to improve display grace.

In addition, when both of the first and second alignment treatment directions PD1 and PD2 are in parallel, and are opposite directions each other, the liquid crystal molecule LM is aligned so that the liquid crystal molecule LM is aligned with an approximately uniform pre-tilt angle near the first and second alignment films AL1 and AL2 and in the intermediate portion of the liquid crystal layer LQ (homogeneous alignment).

A portion of the backlight from the backlight 4 penetrates the first polarizing plate PL1, and enters into the liquid crystal display panel LPN. The entered light to the liquid crystal display panel LPN is linearly polarized light orthogonally crossing the first polarizing axis AX1 of the first polarization plate PL1. The linearly polarized state of the entered light does not change with the alignment state of the liquid crystal molecule LM when the light passes the liquid crystal layer LQ at the time OFF. Therefore, the lineally polarized light which penetrates the liquid crystal display panel LPN is absorbed by the second polarization plate PL2 arranged in a Cross Nicol positional relation (black display).

On the other hand, in case potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the long axis rotates in parallel with the X-Y plane as shown in a solid line in the figure.

In the embodiment shown in FIG. 2A, in the region between the pixel electrode PE and the main common electrode CAL, the liquid crystal molecule LM in the lower half region rotates clockwise to the second direction Y, and aligns so that it may turn to the lower left in the figure. The liquid crystal molecule LM in the upper half region rotates counter-clockwise to the second direction Y, and aligns so that it may turn to the upper left in the figure. On the other hand, in the region between the main pixel electrode PA and the main common electrode CAR, the liquid crystal molecule LM in the lower half region rotates counter-clockwise to the second direction Y, and aligns so that it may turn to the lower right in the figure. The liquid crystal molecule LM in the upper half region rotates clockwise to the second direction Y, and aligns so that it may turn to the upper right in the figure.

Thus, in each pixel PX, in case electric field is formed between the pixel electrode PE and the common electrode CE, the alignment direction of the liquid crystal molecule LM is divided into a plurality of directions by the position which overlaps with the pixel electrode PE and the common electrode CE, and domains are formed in each alignment direction. That is, a plurality of domains is formed in one pixel PX.

At the time of ON, the linearly polarized light orthogonally crossing the first polarizing axis AX1 of the first polarization plate PL1 enters in the liquid crystal panel LPN and the polarization state of the backlight changes in accordance with the alignment state of the liquid crystal molecule LM when passing the liquid crystal layer LQ. At the time of ON, at least a portion of the light which passes the liquid crystal layer LQ penetrates the second polarization plate PL2 (white display).

According to this embodiment, the counter substrate CT is equipped with the second alignment film AL2 having lower volume resistivity value than that of the liquid crystal layer LQ at a boundary between the liquid crystal layer LQ and the counter substrate CT. Since the volume resistivity value of the second alignment film AL2 is low enough comparing with that of the liquid crystal layer LQ, it becomes possible to distribute electric charges before external electric field reaches to the liquid crystal layer LQ by the second alignment film AL2 even if the counter substrate CT is charged in response to the influence of external electric field which penetrates from the counter substrate CT side i.e., a display surface side. That is, the second alignment film AL2 has a function which shields external electric field. The second alignment film AL2 is in contact with the common electrode CE having lower volume resistivity value. For this reason, it becomes possible for the second alignment film AL2 to diffuse the electric charges more quickly through the common electrode CE.

Moreover, the second adhesives AD2 for attaching the second optical element OD2 to the external surface of the counter substrate CT has the volume resistivity value equal to or less than that of the second alignment film AL2. For this reason, the second adhesive AD2 has a function which shields external electric field by distributing the electric charges at a closer position to the display surface than the liquid crystal layer LQ and the second alignment film AL2.

Therefore, it becomes possible to control penetration of external electric field from the counter substrate CT side to the liquid crystal layer LQ. For this reason, it becomes difficult for the liquid crystal layer LQ to be affected by the undesirable electric field, and it becomes possible to impress necessary electric field to the liquid crystal layer LQ between the pixel electrode PE and the common electrode CE. In particular, in the region in which the common electrode CE is not formed, i.e., the region in which the opening AP is formed, it becomes possible to control the defect of alignment of the liquid crystal molecule resulted from the operating of the liquid crystal molecule by undesirable electric field. Thereby, it becomes possible to control degradation of display grace.

Moreover, according to this embodiment, the array substrate AR is equipped with the first alignment film AL1 having lower volume resistivity value than that of the liquid crystal layer LQ in a boundary between the first alignment film AL1 and the liquid crystal layer LQ. The back light 4 is equipped with an optical sheet on the surface which counters with the first optical element OD1. When the optical sheet and the first optical element OD1 are arranged closely, there is a possibility of producing variation in luminosity in response to the influence of distortion, etc., of the optical sheet. On the other hand, if a large gap is provided between the back light 4 and the first optical element OD1, the thickness of the whole liquid crystal display device increases and slimming down thereof is bared. Therefore, it is thought that a small gap is provided between the back light 4 and the first optical element OD1. Although it is desirable to provide the small gap between the back light 4 and first optical element OD1, the array substrate AR may be charged because the optical sheet floats locally or contacts with the first optical element OD1 locally. According to this embodiment, even if the array substrate AR is charged, it becomes possible to distribute the electric charges by the first alignment film AL1 before the external electric field reaches to the liquid crystal layer LQ because the volume resistivity value of the first alignment film AL1 is sufficiently low as compared with that of the liquid crystal layer LQ. That is, the first alignment film AL1 has a function which shields external electric field.

Moreover, the first adhesives AD1 for attaching the first optical element OD1 to the external surface of the array substrate AR has the volume resistivity value equal to or less than that of the first alignment film ALL For this reason, the first adhesives AD1 has a function to distribute the electric charges and to shield the external electric field at a closer location to the back light 4 than the liquid crystal layer LQ and the first alignment film AL. Therefore, it also becomes possible to control the penetration of the external electric field from the array substrate AR side to the liquid crystal layer LQ.

The first alignment film AL1 and the second alignment film AL2 are indispensable components to regulate the alignment of the liquid crystal molecule LM in the liquid crystal display panel LPN. Moreover, the first adhesives AD1 and the second adhesives AD2 are indispensable components in order to attach the first optical element OD1 and the second optical element OD2 to the liquid crystal display panel LPN, respectively. Since the first alignment film AL1 and the second alignment film AL2, and the first adhesives AD1 and the second adhesives AD2 are respectively formed of materials having low volume resistivity value, and have the function which shields external electric field, it becomes unnecessary to provide a shield electrode separately. Moreover, it is unnecessary to perform patterning of the first alignment film AL1 and the second alignment film AL2, and the first adhesives AD1 and the second adhesives AD2. Accordingly, it becomes possible to simplify the manufacturing process and to reduce the manufacturing cost.

Moreover, slimming down of the liquid crystal display device is demanded, and the cases which grind the substrates are increasing in number in recent years.

In the above case, by adopting the structure which provides the first alignment film AL1 having the electric shield function inside the array substrate AR, and the second alignment film AL2 having the electric shield function inside the counter substrate CT, respectively, it becomes possible to control undesirable electrification of the array substrate AR and the counter substrate CT through the manufacturing processes including the process for grinding the substrate. Moreover, according to this embodiment, since the process of forming the shield electrode on the external surface in the substrate can be skipped as compared with the case where the shield electrode is provided, it becomes possible to simplify the manufacturing processes and to reduce the manufacturing cost.

Moreover, in the liquid crystal display device, impurity ions (or electric charges) contained in the liquid crystal layer LQ are attracted to the surfaces of the array substrate AR and the counter substrate CT and accumulated on the surfaces of the first alignment film AL1 and the second alignment film AL2. In this case where the ions and the electric charges are localized, undesirable burn-in phenomenon is resulted easily.

For improving the burn-in phenomenon, it is important to ease the localized state of the electric charges by distributing the accumulated impurity ions in the first alignment film AL1 and the second alignment film AL2 into the liquid crystal layer LQ quickly. According to this embodiment, since the volume resistivity values of the first alignment film AL1 and the second alignment film AL2 are low enough, the state where the electric charges localized can be eased quickly and it becomes possible to improve the burn-in phenomenon.

Moreover, since high transmissivity is obtained in the electrode gap between the pixel electrode PE and the common electrode CE according to this embodiment, it becomes possible to correspond by expanding the inter-electrode distance between the pixel electrode PE and the main common electrodes CA in order to make transmissivity of each pixel high enough. Moreover, in the product specifications in which the pixel pitch differs each other, the same effect as the above mentioned embodiment can be acquired by changing the inter-electrode distance and using a peak condition of the transmissivity distribution. That is, in the display mode according to this embodiment, it becomes possible to supply the display device having various pixel pitches by setting up inter-electrode distance between the main pixel electrode and main common electrode corresponding to the product specification from low resolution with a comparatively large pixel pitch to high resolution with a comparatively small pixel pitch without necessarily using microscopic processing. Therefore, it becomes possible to realize the demand for high transmissivity and high resolution easily.

Moreover, if its attention is paid to the transmissivity distribution in the region which overlaps with the black matrix BM, the transmissivity fully falls. This is because the leak of electric field does not occur outside of the pixel from the common electrode CE, and undesired lateral electric field is not produced between the adjoining pixels on the both sides of the black matrix BM. That is, it is because the liquid crystal molecule of the region which overlaps with the black matrix BM maintains the state of the initial alignment like at the OFF time (or the time of the black display). Therefore, even if it is a case where the colors of the color filter differ between the adjoining pixels, it becomes possible to control the generating of mixed colors, and also becomes possible to control the fall of color reproducibility and the contrast ratio.

Moreover, when an assembling shift occurs between the array substrate AR and the counter substrate CT, a difference may arises in distances between the respective common electrodes CE of the both sides and the pixel electrode PE. However, the alignment shift is produced in common to all the pixels PX, there is no difference in the electric field distribution between the pixels PX, and the influence to the display of the image is negligible. Even if the assembling shift arises between the array substrate AR and the counter substrate CT, it becomes possible to control the undesirable electric field leak to the adjoining pixels. For this reason, even if it is in a case where the color of the color filter differs between the adjoining pixels, it becomes possible to control generating of mixed colors, and also becomes possible to realize more genuine color reproducibility nature.

In this embodiment, the main common electrodes CA counter with the source lines S, respectively. In the case, the aperture portion AP which contributes to the display can be expanded as compared with the case where the main common electrode CA is arranged on the pixel electrode PE side rather than above the source line S, and it becomes possible to improve the transmissivity of the pixel PX. Moreover, it becomes possible to expand the distances between the pixel electrode PE and the main common electrode CA in the first direction X, by arranging the main common electrodes CA above the source lines S, respectively, and also becomes possible to form more horizontal electric field closer to the horizontal direction. For this reason, it becomes possible also to maintain the wide viewing angle which is advantages of the general IPS mode.

Moreover, according to this embodiment, it becomes possible to form a plurality of domains in each pixel. For this reason, a viewing angle can be optically compensated in a plurality of directions, and wide viewing angle is attained.

In addition, although the above embodiment explains the case where the initial alignment direction D of the liquid crystal molecule LM is arranged in parallel to the second direction Y, the initial alignment direction D of the liquid crystal molecule LM may be an oblique direction obliquely crossing the second direction Y.

Moreover, in the above embodiment, although the case where the liquid crystal layer LQ is constituted by the liquid crystal material which has positive (positive type) dielectric constant anisotropy is explained, the liquid crystal layer LQ may be constituted by liquid crystal material which has negative (negative type) dielectric constant anisotropy. In the both positive type and negative type of the liquid crystal layer LQ, the volume resistivity value of the liquid crystal layer LQ is approximately the same as that in the above embodiment, and the materials having approximately the same volume resistivity value as above embodiment are used for the first alignment film AL1 and the second alignment film AL2 contacting with the liquid crystal layer LQ.

Furthermore, even at the time of ON, since the lateral electric field is hardly formed (or sufficient electric field to drive the liquid crystal molecule LM is not formed) on the pixel electrode PE or the common electrode CE, the liquid crystal molecule LM hardly moves from the initial alignment direction like at the time of OFF. For this reason, as mentioned-above, even if the pixel electrode PE and the common electrode CE are formed of the electric conductive material with the light transmissive characteristics like ITO in these regions, the backlight hardly penetrates, and hardly contributes to the display at the time of ON. Therefore, the pixel electrode PE and the common electrode CE are not necessarily needed to be formed of a transparent electric conductive material, and may be formed using non-transparent electric conductive materials.

The structure of the pixel PX is not limited to the embodiment shown in FIG. 2A. Below, other embodiments are explained.

Figure 4:
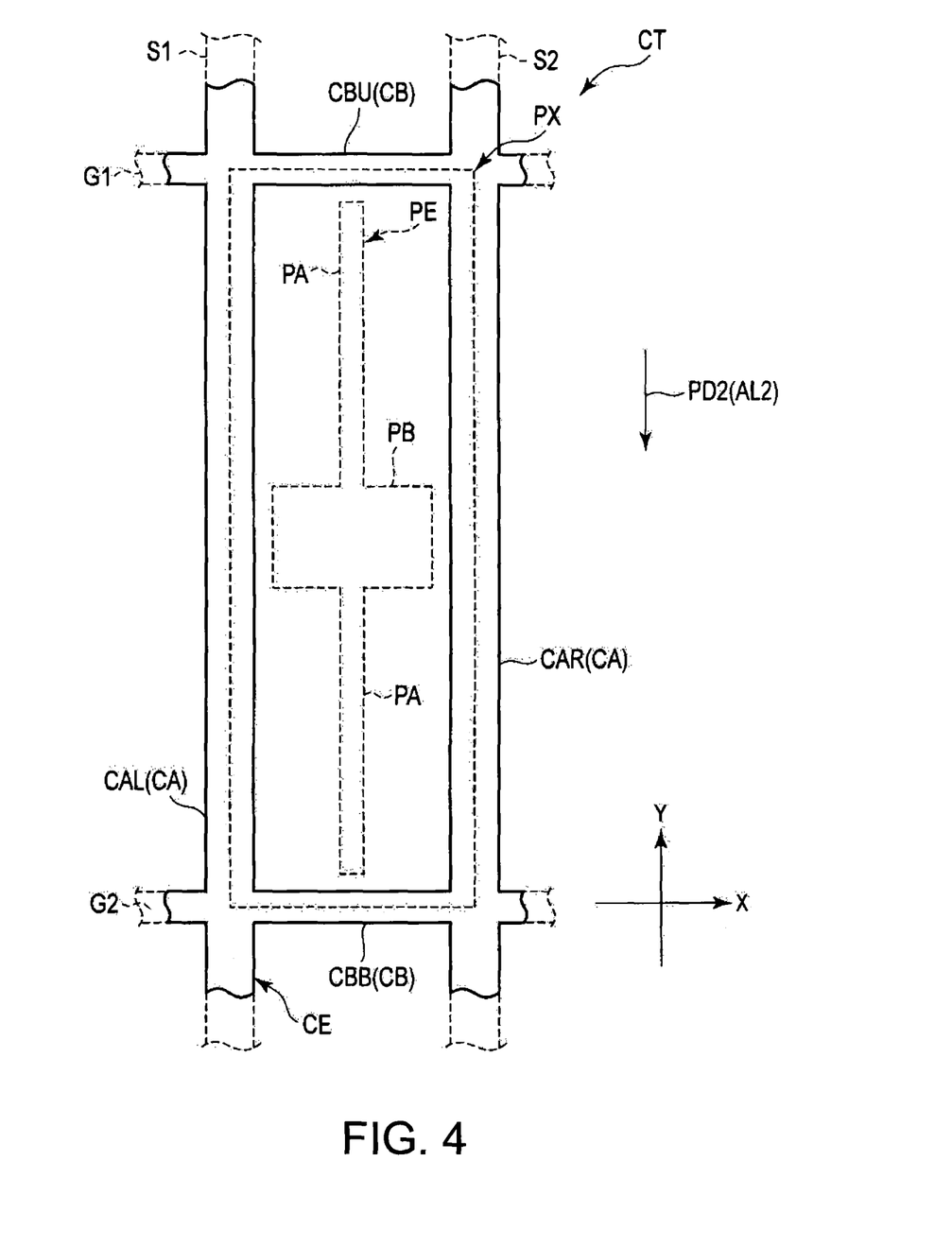
FIG. 4 is a plan view schematically showing the structure of the counter substrate according to a second embodiment.

FIG. 4 shows a structure of the counter substrate according to a second embodiment. The counter substrate CT is further equipped with a sub-common electrode CB which constitutes the common electrode CE. That is, the common electrode CE is equipped with the sub-common electrode CB formed integrally or continuously with the main common electrode CA above the gate line G in a belt shape and extending along the first direction X. In this embodiment, the counter substrate CT is equipped with a sub-common electrode CBU arranged at the upper end of the pixel PX and a sub-common electrode CBB arranged at the bottom end of the pixel PX. The sub-common electrode CBU is located above the gate wiring G1, and the sub-common electrode CBB is located above the gate wiring G2. The common electrode CE including the main common electrode CA and the sub-common electrode CB is covered with the second alignment film AL2, and in contact with the second alignment film AL2. The common electrode CE including the main common electrode CA and the sub-common electrode CB is formed in the shape of a lattice in the counter substrate CT.

When applying the counter substrate CT equipped with the common electrode CE, the pixel electrode PE is located on the inner side surrounded with the common CE in the shape of a lattice in the X-Y plane.

Also in this embodiment, since the second alignment film AL2 is in contact with the common CE in the lattice shape, it becomes possible to distribute electric charges more quickly.

Figure 5:
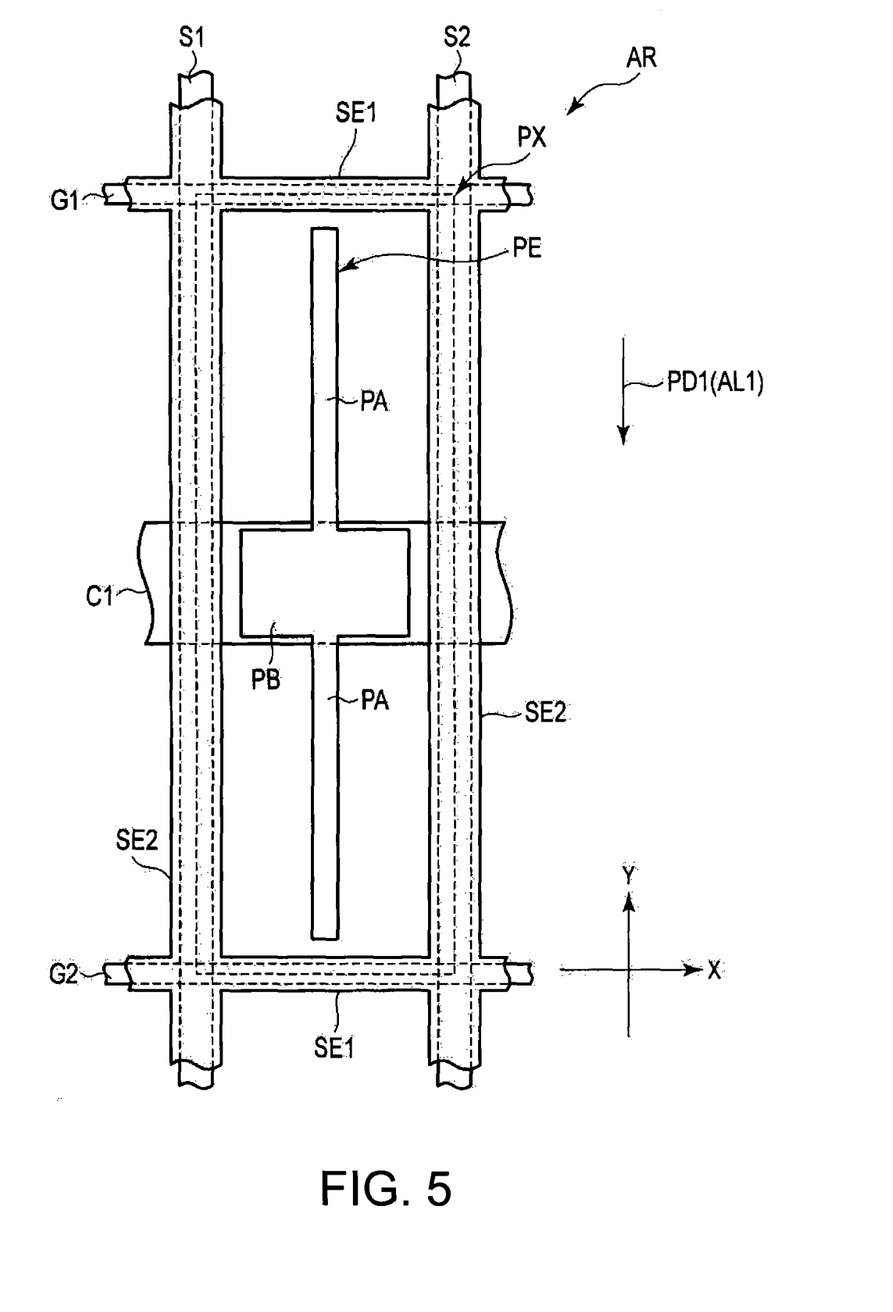
FIG. 5 is a plan view schematically showing the structure of an array substrate according to a third embodiment.

FIG. 5 is a plan view schematically showing the structure of the array substrate according to a third embodiment. The array substrate AR is further equipped with a first shield electrode SE1 and a second shield electrode SE2. The first shield electrode SE1 is set to the same potential as that of the common electrode CE and extends along the first direction X. The first shield electrode SE1 is formed so that it may counter with each of the gate lines G. The first shield electrode SE1 is covered with the first alignment film AL1, that is, contacts with the first alignment film AL1. By providing the first shield electrode SE1, it is possible to shield undesirable electric field from the gate line G. For this reason, it becomes possible to control degradation of the display grace.

The second shield electrode SE2 is set to the same potential as that of the common electrode CE and extends along the second direction Y. The second shield electrode SE2 is formed so that it may counter with each of the source lines S. The second shield electrode SE2 is covered with the first alignment film AL1, that is, contacts with the first alignment film AL1. By providing the second shield electrode SE2, it is possible to shield undesirable electric field from the source line S. For this reason, it becomes possible to control degradation of the display grace.

As shown in the figure, when the first shield electrode SE1 and second shield electrode SE2 are combined, the first shield electrode SE1 and the second shield electrode SE2 are formed integrally or continuously, and form the shape of a lattice. The pixel electrode PE is located on the inner side surrounded by the first shield electrode SE1 and the second shield electrode SE2 in this case. However, the pixel electrode PE is arranged apart from the first shield electrode SE1 and the second shield electrode SE2, and electrically insulated.

Also in this embodiment, since the first alignment film AL1 is in contact with the first shield electrode SE1 and the second shield electrode SE2 in the shape of a lattice, it becomes possible to distribute the electric charges more quickly.

As explained above, according to the embodiments, it becomes possible to supply the liquid crystal display device which can control degradation of display grace.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:
1. A liquid crystal display device, comprising:
   a first substrate including:
      first and second gate lines and an auxiliary capacitance line respectively extending in a first direction, the auxiliary capacitance line being arranged approximately in a center between the first and second gate lines, first and second source lines extending in a second direction orthogonally crossing the first direction,
a drain line extending along the source line and the auxiliary capacitance line,
a switching element arranged at a crossing portion of the gate line with the source line and electrically coupled with the gate line and the source line,
a pixel electrode including a sub-pixel electrode electrically coupled with the switching element through a contact hole formed at an overlapping portion with the auxiliary capacitance line and extending in the first direction in the shape of a belt, and a main pixel electrode electrically coupled with the sub-pixel electrode and extending in the second direction,
a first alignment film covering the pixel electrode to contact with the pixel electrode, resistivity of the pixel electrode being lower than that of the first alignment film; and
a second substrate including:
a common electrode having a pair of main common electrodes arranged above the first and second source lines sandwiching the main pixel electrode and extending in the second direction,
a second alignment film covering the common electrode to contact with the common electrode, resistivity of the common electrode being lower than that of the second alignment film, and
a liquid crystal layer held between the first substrate and the second substrate and including liquid crystal molecules;
a first optical element including a first polarization plate attached to an outer surface of the first substrate by a first adhesive; and
a second optical element including a second polarization plate attached to an outer surface of the second substrate by a second adhesive; wherein
a volume resistivity value of the first alignment film is lower than that of the liquid crystal layer,
a volume resistivity value of the first adhesive is less than that of the first alignment film,
a volume resistivity value of the second alignment film is lower than that of the liquid crystal layer,
a volume resistivity value of the second adhesive is less than that of the second alignment film,
the volume resistivity values of the first and second alignment films are respectively set to an order of $1.0 \times 10^{11}$ Ω·cm, and
the volume resistivity values of the first and second adhesives are in a range of approximately $0.2 \times 10^{11}$ Ω·cm to $0.7 \times 10^{11}$ Ω·cm, and
the first polarization plate includes a first polarizing axis and the second polarization plate includes a second polarizing axis, and the first polarizing axis of the first polarization plate is arranged in parallel with or orthogonally crossing the initial alignment direction of the liquid crystal molecules.

2. The liquid crystal display device according to claim 1 wherein the common electrode includes a sub-common electrode arranged above the gate line and extending in the first direction in the shape of a belt and forming a lattice shape with the pair of the main common electrodes.

3. The liquid crystal display device according to claim 2, wherein
the first substrate includes a first shield electrode facing the gate line and a second shield electrode arranged facing the source line, respectively covered with the first alignment film,
the first and second shield electrodes are set to the same electric potential as that of the common electrode, and
the first and second shield electrodes are formed in a lattice shape and contacted with the first alignment film.

4. The liquid crystal display device according to claim 1, wherein the first polarizing axis is set in a Crossed Nicol positional relation with the second polarizing axis.

\* \* \* \* \*